Aug. 9, 1966        J. C. BEYNON        3,264,871
MAGNETIC RECORDING READOUT FOR FLOWMETER
Filed Aug. 20, 1963
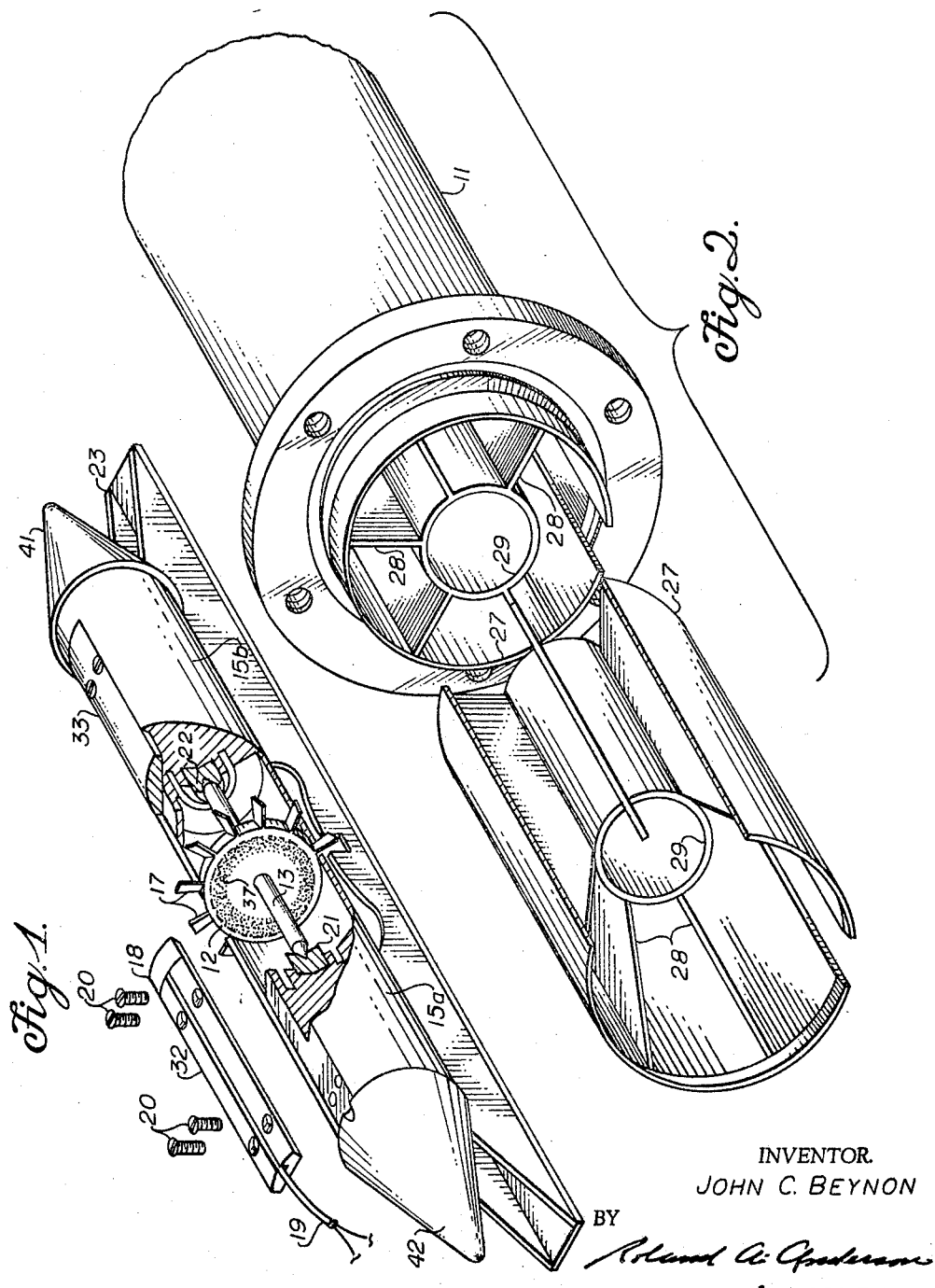
INVENTOR.
JOHN C. BEYNON
BY
Roland A. Anderson
ATTORNEY

United States Patent Office 3,264,871
Patented August 9, 1966

3,264,871
MAGNETIC RECORDING READOUT FOR
FLOWMETER
John C. Beynon, North Hollywood, Calif., assignor to the
United States of America as represented by the United
States Atomic Energy Commission
Filed Aug. 20, 1963, Ser. No. 303,457
8 Claims. (Cl. 73—231)

The invention described herein was made in the course of, or under, a contract with the U.S. Atomic Energy Commission.

This invention relates to flowmeters and in particular to an improved data readout mechanism therefor utilizing a magnetic recording sensing system.

For determining the flow rate of fluid materials being transported by pipelines and the like, many variations of turbine-type flowmeters have developed. In operation, the turbine of the flowmeter is driven by the passing fluid and it is common in devices for the readout of turbine flowmeters to use a fixed sensor which delivers an electrical pulse each time a blade or other portion of the turbine passes the sensor. The signal pulse rate obtained is then interpreted to determine the rate of revolution of the turbine or some other parameter precalibrated to show flow rate. To achieve a fast time response to changing flows, the pulse repetition rate must remain high enough to provide several pulses during the time in which a change in the flow takes place. This condition leads to the requirement of very fast turbine speeds with a consequent pressure drop in the fluid being measured as it passes through the flowmeter. This pressure drop is generally undesirable and may be intolerable in some flow systems, particularly in natural or heat convection systems.

In conventional turbine flowmeters of the type described it is also known to utilize a magnetic readout system. Such a system senses a signal created by the passing of a portion of magnetized material past the sensing element or by a change in the reluctance path in the vicinity of the sensing element. In either case there will be a signal pulse repetition rate per revolution of the turbine limited by the number of permissible blades or other portions on the turbine or magnetic portion attached thereto. When turbine flowmeters of the type described are used in the measurement of very slow flowing fluids the condition of the relatively fast turbine speeds cannot be maintained. As a consequence thereof the signal pulse repetition rate becomes too low to provide information concerning rapid fluctuations in the flow.

The requirement of fast turbine speeds for successful operation of the prior art devices places yet another limitation on their usefulness. There are maximum permissible speeds of operation beyond which the hydromechanical limits of the flowmeter will be exceeded in that the turbulence created by the meter in the fluid stream may become intolerable. The ratio of slowest flows to fastest flows that can be detected, that is the velocity factor range, is directly related to the ratio of minimum and maximum permissible turbine operating speeds. This ratio is usually small, of the order of 10 to 1 in conventional devices. A further disadvantage of prior art turbine flowmeters is their inability to detect the direction of a fluid flow or even changes in flow direction by the same mechanism that measures the flow rate.

The present invention overcomes the foregoing limits and disadvantages of conventional flowmeters by providing a magnetic sensory system which includes a film of magnetic recording medium applied to a rotary member of a turbine-type flowmeter device. Selected frequency waveform electrical signals are prerecorded thereon, which signals are sensed by an appropriately disposed magnetic playback head and the sense signal is utilized to provide directional and flow rate information. This system allows a large number of cycles of signals to be produced per revolution of the turbine, thereby providing wide operating ranges and flexibility of operation.

It is therefore an object of the present invention to provide an improved flowmeter.

Another object of the invention is to provide a flowmeter which is sensitive to slow-flowing fluids.

Still another object of the invention is to provide a flowmeter capable of very fast response to changes in flow rate.

A further object of the invention is to provide a flowmeter which can detect the direction of the flow of the fluid.

Still another object of the invention is to provide a flowmeter which causes negligible pressure drop in the system being measured.

A still further object of the invention is to provide a flowmeter capable of operating over a velocity factor range in excess of 100 to 1.

Other objects, advantages and applications of the invention will become apparent from the following detailed description when taken in connection with the accompanying drawings which form a part of the specification, and in which:

FIGURE 1 is a perspective broken-open view of a flowmeter according to the invention, and FIGURE 2 is a perspective broken-open view of a flume-conduit housing for the flowmeter of FIGURE 1, according to the invention.

Considering now the flowmeter of the invention in detail and referring to the illustrated form thereof in the drawings, there is shown a design of the invention for the measurement of water flow in the range from 10 cc. to 100 cc. per sec. in a one inch diameter channel. As normally employed, the flowmeter should be placed longitudinally with respect to the direction of flow of the fluid, and to that end may be housed in a section of conduit 11, which may be flanged to facilitate installation. Basically, the flowmeter comprises a turbine rotor mounted on a rotor shaft 13 arranged longitudinally in an axial position within said conduit and supported on bearings 21 and 22 attached, e.g., to rotor bearing support segments 15a and 15b. The rotor is constructed with a disk hub 12 having end faces generally transverse of said conduit and an outer peripheral plural turbine blade portion 17. The rotor may be constructed of a light-weight material such as aluminum. The hub disk 12 is provided with a thin film of magnetic recording material 37 applied to one end face surface by any suitable method. For example, the magnetic material may be plated on the disk hub 12 by electrodeposition processes or, if the hub is of plastic, the magnetic film material may be applied as in producing conventional magnetic recording tapes. Any magnetic recording material which will not be corroded by the action of the fluid being measured may be used. In the case of a plating of material, a thickness of up to about 1/1000 of an inch has been found capable of satisfactory recording. One type of suitable electrodeposited film is the nickel-phosphite coating produced as disclosed in the patent application of J. Beynon entitled "Magnetic Recording Device and Method," Serial No. 285,853, filed June 4, 1963, now U.S. Patent No. 3,202,538, issued August 24, 1965. Another type of coating is disclosed in the patent application of L. Cann entitled, "Methods for Providing a Magnetic Medium and Products of the Methods," Serial No. 274,382, filed April 16, 1963. A magnetic record playback head 18 of conventional design is attached to, imbedded or otherwise mounted in a recess in the motor bearing supports 15a in close proximity to the magnetic surface 37 of the disk hub 12, so that the magnetic head 18 can sense a magnetic signal recorded on the magnetic film of said hub. More particularly the aforesaid head may be of a conventional design in which a core piece of easily magnetizable metal terminates in pole pieces defining a narrow linear gap across which a coil wound upon said core piece may induce a magnetic field or sense a magnetic field moving in proximity to the aforementioned gap, as customarily employed in magnetic tape recording and reproduction. Such head may be molded in plastic or otherwise encased to provide corrosion resistance and support.

In operating the device of the invention a suitable source (not shown) of audio frequency current or of a pulsating current output having either a sinusoidal, squarewave, or sawtooth output current form is coupled to conductors 19 feeding said recording head and the corresponding frequency and pulse rate is then recorded on the magnetic material film at a predetermined or standard rate of revolution. For most purposes, the turbine rotor is rotated at a rate at which the frequency of the recorded signal is an even integer multiple thereof and the recorded signal peaks have a uniform spacing and intensity about the recorded track. It is conceivable that variable intensity partially discontinuous or other types of tracks might be useful for certain purposes. The magnetic head 18 is provided with output terminals (not shown) to which suitable conducting means 19 such as insulated wires may be connected to extend to the exterior of conduit 11.

In operation, the output of the recorder head is coupled to any type of device which can measure or indicate the R.M.S. output voltage. Since a playback reproduction head is normally a rate of change sensing device, the R.M.S. voltage output is a direct measure of the turbine speed, i.e., rate of rotation, when a uniform frequency rate master recording has been made on the aforesaid film. Conventional frequency measuring devices may also be coupled to said head to indicate rate of rotation and calibrated to indicate the flow rate of a fluid through the flowmeter.

Since the recorded waveshape may be of any convenient type special wave forms such as a sawtooth shape may be employed. When using such a sawtooth signal, flow rate and the direction of flow can be observed with the aid of an oscilloscope or a conventional differentiating circuit connected to the output of the magnetic head.

In the preferred arrangement, the bearing supports 15a and 15b have elongated conically tipped streamline end pieces 41 and 42 secured thereto by an axial threaded portion (not shown) to minimize the creation of turbulent flow conditions. The supports 15a and 15b are spaced axially with rotor bearings 21 and 22 being disposed on proximal recessed faces thereof respectively, with other portions of said supports 15a and 15b terminating in closely spaced relation to the rotor hub 12. A U-shaped channel member 23 attached by screws (not shown) to the lower sides thereof may be utilized to maintain the bearing supports in proper position and also to attach the flowmeter assembly in said conduit. The fluid flow may be completely restricted to the annular area occupied by the rotor blade 17 by the combined action of the streamlined bearing supports 15a and 15b and a collimating flume element disposed about the support elements. The flume element may be made in two matching mirror image halves with an outer tubular shell 27, radially inward projecting longitudinally ribs 28 and an inner tubular shell 29 disposed to encompass the length of said supports 15a and 15b. Said shells are made discontinuous along the length of an annular segment to accommodate the U-shaped channel member 23 which member is constructed to provide a similar configuration as that defined by adjacent pairs of ribs 28 whereby a uniform and symmetrical flow path is provided. In the inlet and outlet portions of said flume element halves, ribbed ends are tapered to extend from the open end of shell 29 to the end of shell 27 which projects beyond shell 29. Inset portions 32 and 33 may be used to close the upper opening of the recesses in said supports in 15a and 15b and the recording head 18 may be conveniently mounted with screws 20 in the end of inset portion 32 with insulated conductors 19 from the terminal of the magnetic lead being led through a groove provided in the upper surface if desired. The flume will also act to cause the flow of fluid to become parallel to the axis of rotation of the turbine. When the flow of fluid is parallel to the axis of the turbine, the need for compensation or calibration errors will be minimized. To assemble the flowmeter, the flume element halves are installed on the bearing supports 15a and 15b by slipping them over said supports and retained thereon by disposition of the conical end pieces 41 and 42 upon the supports as described. The assembled flowmeter may then be inserted into the conduit which is then ready for incorporation into the system in which a fluid velocity is to be measured.

The number of cycles of recording per revolution which can be recorded on the magnetic recording media hub 12 and read back without substantial fadeout depends upon the magnetic head gap, the rotor to head spacing, and the radius of the recorded track. The following example will serve to illustrate one set of operating parameters for annular recording tracks ½ inch in average diameter corresponding to an annular turbine blade and annular flume element flow area disposed between ⅝" and ⅞" diameter.

Magnetic head gap—.001 in.
Magnetic head to hub distance—.001 in.
Recorded wavelength—.004 in. or 250 cycles per in
Width of recorded track—.040 in. (radially oriented)

It has been found satisfactory to use the 250 cycle per in. recording for maximum sensitivity to slow flow fluid conditions. However, if such sensitivity is not required a higher signal level will be obtained over a wider range of flows if a recording between 50 and 100 cycles per in. is used.

The recording-reproducing head is constructed of two ferrite cores (ferrox cube) having a throat thickness of 0.010 in. and the 0.001 in. gap is maintained with a 0.001 in. silver shim. The rotor film is demagnetized by means of a strong external field and a 1 watt oscillator set to a frequency corresponding to an integer multiple of the rotor speed in revolutions per second. The magnetizing current is increased gradually to a peak level of about 4 ampere turns, maintained for several revolutions and then gradually decreased to zero level. In many cases it is quite convenient to utilize a frequency giving 60 cycles per revolution so that the readout frequency corresponds to the revolutions per minute of the rotor. Air stream velocities as low as ½ mile per hr. are easily measured. Water flow rates in the range of 1 to 500 cc. per sec. have been measured, indicating the flow velocity ratios of at least 100 to 1 can be easily and reliably measured with a very low pressure drop.

While there has been described a preferred embodiment of the invention, it will be apparent to those skilled in the art that various changes and modifications may be made in the design to allow for variation in the viscosity, density, volume, or rate of flow to be measured. For example the rotor may be made of composite construction with the rotor blades and an outer ring of the disk being fabricated of a plastic material and the inner disk of the metal with an applied magnetic coating. Where there is only a minor corrosion or abrasion problem, the rotor could be fabricated entirely of plastic and coated with the iron oxide forms presently used in commercial magnetic tape applications.

Various other embodiments of the present invention, in addition to what has been illustrated and described,

What is claimed is:

1. A flowmeter comprising a turbine rotor having an inner hub portion and a bladed portion extending radially outwardly from said hub portion, means for mounting said rotor for rotation about its axis in response to fluid flow past said bladed portion, magnetic recording means for receiving cyclic magnetic intensity variations, said recording means disposed on an annular planar surface of said hub portion coaxial with and perpendicular to the axis of rotation of said rotor, and a magnetic record playback head disposed in magnetic field transmit-receive relation directly adjacent to said magnetic recording means.

2. The flowmeter of claim 1 wherein said mounting means are adapted for insertion within a conduit, and including means for restricting essentially all of the fluid flow in said conduit against said bladed portion, and electrical conductor means connecting said magnetic head to an outer portion of said conduit.

3. A flowmeter according to claim 1 in which said magnetic recording means is a film of nickel-phosphite.

4. A flowmeter according to claim 1 in which said rotor is of plastic composition and said recording means an iron oxide composition.

5. The flowmeter of claim 1 in which magnetic intensity variations of sinusoidal wave form are imparted on said magnetic recording means.

6. The flowmeter of claim 1 wherein said magnetic variations are of sawtooth shaped wave form.

7. The flowmeter of claim 1 wherein said cyclic magnetic variations occur in the range of 50 to 250 cycles per inch.

8. A flowmeter according to claim 2 in which said conduit is a cylindrical shell and said rotor has its axis of rotation in longitudinal axial alignment with said shell.

References Cited by the Examiner

UNITED STATES PATENTS

| | | | |
|---|---|---|---|
| 2,842,963 | 7/1958 | Ardley | 73—231 |
| 2,913,662 | 11/1959 | Hogan | 324—70 |
| 3,101,615 | 8/1963 | Pavone | 73—231 |
| 3,124,490 | 3/1964 | Schmeckenbecher. | |
| 3,189,886 | 6/1965 | Sonntag | 73—70 X |

RICHARD C. QUEISSER, *Primary Examiner.*

EDWARD D. GILHOOLY, *Assistant Examiner.*